(12) United States Patent
Mastrocola et al.

(10) Patent No.: US 11,075,571 B2
(45) Date of Patent: Jul. 27, 2021

(54) INFINITE STROKE LINEAR MOTOR

(71) Applicant: Hamilton Sundstrand Corporation, Charlotte, NC (US)

(72) Inventors: Naison E. Mastrocola, Goshen, CT (US); Richard A. Poisson, Avon, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 514 days.

(21) Appl. No.: 15/690,605

(22) Filed: Aug. 30, 2017

(65) Prior Publication Data

US 2019/0068040 A1 Feb. 28, 2019

(51) Int. Cl.
*H02K 41/03* (2006.01)
*H02K 41/035* (2006.01)

(52) U.S. Cl.
CPC ....... *H02K 41/031* (2013.01); *H02K 41/0358* (2013.01); *H02K 2207/00* (2013.01)

(58) Field of Classification Search
CPC ............. H02K 2007/00; H02K 41/031; H02K 41/0358
See application file for complete search history.

(56) References Cited

U.S. PATENT DOCUMENTS

| | | | |
|---|---|---|---|
| 1,132,445 A | 3/1915 | Conrad | |
| 4,514,602 A * | 4/1985 | Owen | H01H 9/0005 200/16 C |
| 4,803,387 A | 2/1989 | Seider | |
| 5,001,357 A * | 3/1991 | Adams | F03B 17/00 290/1 R |
| 5,990,583 A * | 11/1999 | Nanba | G03G 15/04 310/12.14 |
| 6,943,465 B2 | 9/2005 | Kim et al. | |
| 6,977,450 B2 | 12/2005 | Asou et al. | |
| 7,456,526 B2 | 11/2008 | Teramachi et al. | |
| 7,675,202 B1 | 3/2010 | Huang | |
| 8,286,935 B2 | 10/2012 | White | |
| 2009/0102413 A1* | 4/2009 | Hanlon | B64C 27/08 318/738 |
| 2009/0284192 A1 | 11/2009 | Deal | |

FOREIGN PATENT DOCUMENTS

| | | |
|---|---|---|
| EP | 3199807 A1 | 8/2017 |
| EP | 3451514 A1 | 3/2019 |
| JP | 2004096913 A | 3/2004 |

OTHER PUBLICATIONS

European Search Report for Application No. 18191262.7-1202, dated Jan. 16, 2019, 18 pages.
EP Office Action; Application No. 18 191 262.7-1202; dated Mar. 11, 2021; 7 pages.

* cited by examiner

*Primary Examiner* — Thienvu V Tran
*Assistant Examiner* — Bart Iliya
(74) *Attorney, Agent, or Firm* — Cantor Colburn LLP

(57) ABSTRACT

An embodiment of a linear motor assembly includes an armature extending linearly along an axis, the armature having a plurality of windings. The linear motor assembly also includes a magnetic assembly including a plurality of magnets arrayed in a loop configuration, a linear section of the plurality of magnets extending linearly through the plurality of windings in a direction parallel to the axis, each magnet of the linear section being oriented in the direction and configured to move in the direction due to interaction between the plurality of windings and a magnetic field generated by the magnetic assembly.

10 Claims, 3 Drawing Sheets

INFINITE STROKE LINEAR MOTOR

BACKGROUND

Exemplary embodiments pertain to the art of electric motors and actuators for use in aircraft and other systems.

A typical linear motor incorporates multi-phase electric coils and permanent magnets to obtain linear translation. The stroke of such a motor is limited by the length of the active section of the motor. A linear motor topography can be useful for certain applications, however the topography can be limited in some circumstances (e.g., if force amplification through mechanical advantage is desired).

BRIEF DESCRIPTION

Disclosed is a linear motor assembly that includes an armature extending linearly along an axis, the armature having a plurality of windings. The linear motor assembly also includes a magnetic assembly including a plurality of magnets arrayed in a loop configuration, a linear section of the plurality of magnets extending linearly through the plurality of windings in a direction parallel to the axis, each magnet of the linear section being oriented in the direction and configured to move in the direction due to interaction between the plurality of windings and a magnetic field generated by the magnetic assembly.

Also disclosed is a method of operating a linear motor assembly, which includes applying an electric current to a plurality of windings, the plurality of windings disposed on an armature extending linearly along an axis. The method also includes causing movement of a magnetic assembly due to interaction between the plurality of windings and a magnetic field generated by a magnetic assembly, the magnetic assembly including a plurality of magnets arrayed in a loop configuration, a linear section of the plurality of magnets extending linearly through the plurality of windings in a direction parallel to the axis, each magnet of the linear section being oriented in the direction, wherein the movement of the magnetic assembly includes a movement of each magnet of the linear section in the direction and through the plurality of windings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments described herein include aspects of a linear motor and methods of operating a linear motor. In one embodiment, a linear motor includes a magnetic assembly arrayed in a loop configuration and configured to extend through a plurality of windings disposed on a linearly extending armature. A linear section of the magnetic assembly extends linearly through the plurality of windings in a direction at least substantially parallel to a longitudinal axis of the armature. Movement of the magnetic assembly through the armature may be transferred to a rotational component of a support structure, which can be used as an actuator to move an aircraft component or other moveable component or device. In one embodiment, the magnetic assembly includes a plurality of magnets having an orientation or polarity in a direction of movement of the magnetic assembly.

Embodiments described herein also include an actuator assembly including the linear motor, and methods of operating the linear motor and/or the actuator assembly to control movement (e.g., rotation) of a moveable component.

Figure 1:
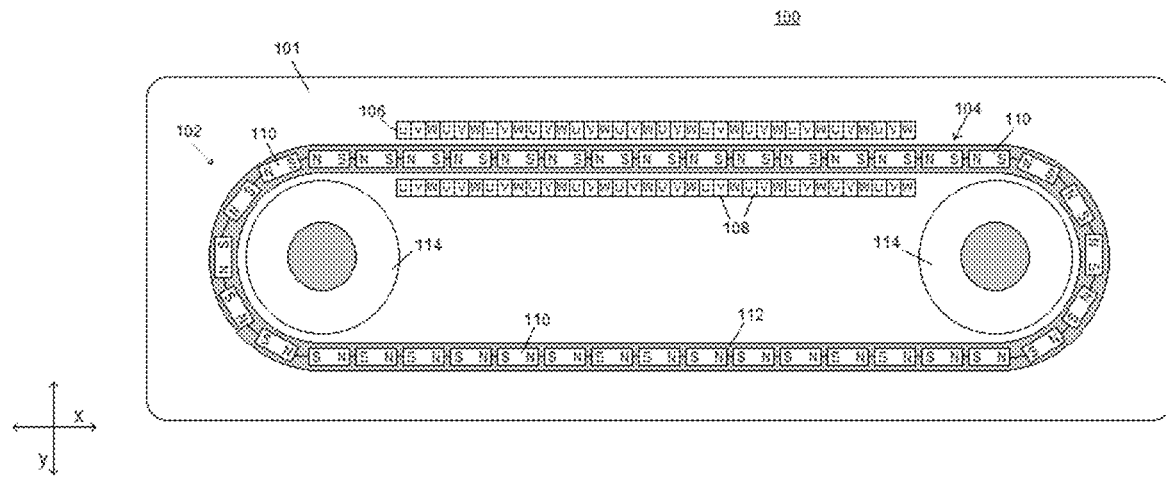
FIG. 1 is a cross-sectional view of an embodiment of a linear motor having an elongated armature and a magnetic assembly including a plurality of magnets arrayed in a loop configuration.

Referring to FIG. 1, an embodiment of a linear motor 100 includes a housing 101 and a motor assembly 102. The motor assembly 102 includes a magnetic assembly 104 and an armature 106. Relative movement between the magnetic assembly 104 and the armature 106 is generated by interaction between a magnetic field generated by the magnetic assembly 104 and current flowing through windings on the armature 106. In the embodiment of FIG. 1, the armature 106 is a stationary component (stator) and the magnetic assembly 104 is moveable in response to applying current thereto. Alternatively, the magnetic assembly 104 can be configured as the stationary component and the armature can be configured as the moveable component.

The armature 106 supports a plurality of conductor windings 108. In one embodiment, the conductor windings are multi-phase windings. For example, as shown in FIG. 1, the windings 108 are three-phase windings having phases U, V and W. The windings 108 are wound in a circumferential path around a linearly extending section of the magnetic assembly 104. The linearly extending section of the magnetic assembly 104 in this embodiment is in a direction denoted by an x-axis. In one embodiment, the circumferential path of the windings has a directional component that is in a plane orthogonal to the direction of the linearly extending section, e.g., the x-axis. For example, if the plane is described in polar coordinates defined by a radial coordinate that is perpendicular to the x-axis and an angular coordinate, the circumferential path may be in a direction of the angular coordinate (i.e., an angular direction) or at least a directional component of the path is in a direction of the angular coordinate.

In one embodiment, the armature 106 is an elongated and linearly extending component having a longitudinal axis that is at least substantially parallel to the x-axis. For example, as shown in FIG. 1, the armature can be a tubular component (e.g., a hollow rod or shaft) that surrounds at least a linearly extending section of the magnetic assembly 104. Any other armature configuration can be used that supports the windings so that the magnetic assembly 104 can travel through the windings 108.

In one embodiment, the magnetic assembly 104 includes a plurality of magnets 110 arrayed in a loop configuration. The loop is configured so that the magnets 110 travel through the windings 108 in the x-axis direction when the magnets 110 are at the linear section of the loop. It is noted that the magnetic assembly can be moved in either direction along the x-axis (e.g., forward or reverse).

The plurality of magnets 110 may be connected as individual segments each having one or more magnet pitches, which are attached or formed as a chain, attached to a belt or connected to any other suitable structure that allows for linear and rotational movement, such as an automotive style chain or drive belt. For example, the magnets 110 can be attached to a belt 112 that is wrapped around a suitable support structure having rotating components 114. One or more rotating components 114 or other structures can be operable connected to a gear assembly, shaft or other mechanism for transferring movement and torque generated by the magnetic assembly 104.

Figure 2:
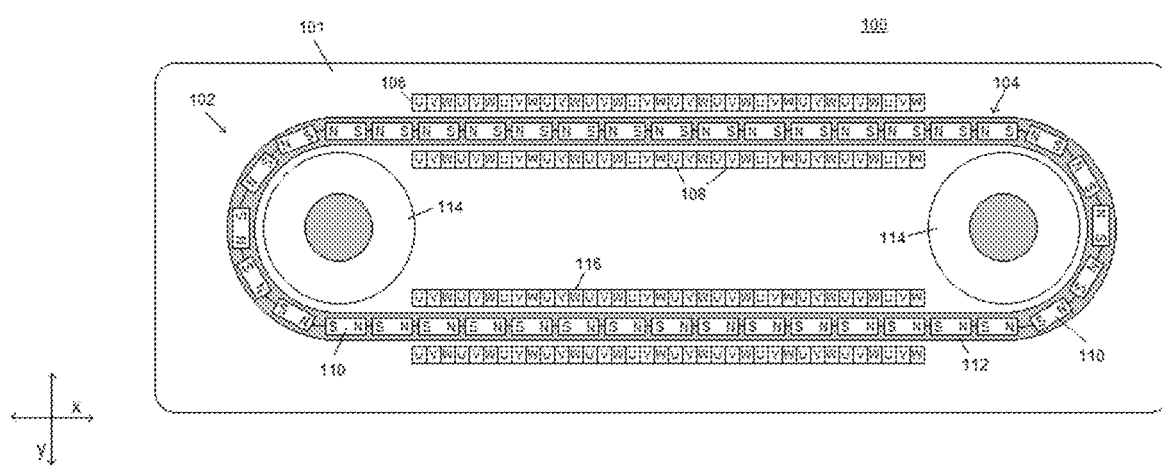
FIG. 2 is a cross-sectional view of an embodiment of a linear motor having a plurality of elongated armatures and a magnetic assembly including a plurality of magnets arrayed in a loop configuration.

In one embodiment, the linear motor 100 includes multiple armatures that can include windings. For example, as shown in FIG. 2, the linear motor 100 can have an additional armature 116 having a longitudinal axis that is at least substantially parallel to the x-axis and disposed at another location around the magnetic assembly 104.

The linear motor 100 may include and/or be coupled to one or more additional devices and/or components for operating the linear motor 100 or controlling aspects of the linear motor 100. For example, the linear motor 100 can include a commutator (e.g., including brushes for a brushed DC motor or an inverter/switch or other electronic commutator for a brushless motor). The linear motor 100 may include and/or be coupled to a control device or system, such as a feedback device. The feedback device may include components such as resolvers, linear variable differential transformers (LVDTs), encoders and others.

Figure 3:
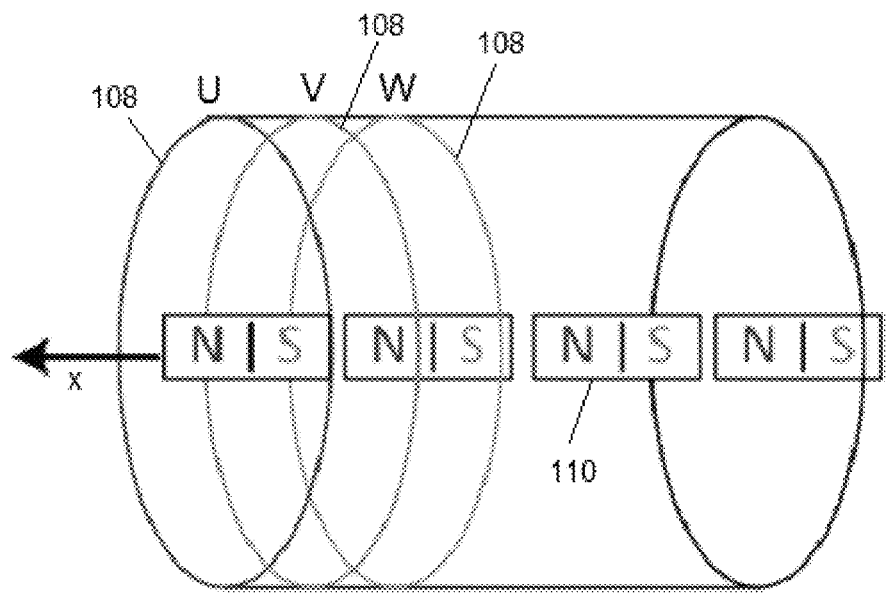
FIG. 3 depicts aspects of the linear motor of FIGS. 1 and 2 and illustrates relative orientations of the magnetic assembly and windings disposed on the armature.

FIG. 3 shows an embodiment of the magnetic assembly 104 and the windings 108 and illustrates the relative orientations of magnets 110 when they are positioned within the windings 108. In this embodiment, the polarity of each magnet 108 is in the direction of travel of each magnet 108. The windings 108, which are three-phase windings in this embodiment, are circumferentially oriented around the x-axis. This orientation and the circumferential stator ensures that there is no net attractive force on the magnets 108.

The linear motor 100 provides for a flat linear stator configuration and stator length that is mathematically infinite and has an infinite stroke. The linear motor 100 can thus be a relatively flat motor that can be used for purposes such as force amplification, e.g., by coupling the linear motor 100 to a gear assembly.

In one embodiment, the linear motor 100 is incorporated into an actuator or control assembly configured to perform various functions. For example, the actuator can be incorporated into a component of an aircraft, such as a flap or a stabilizer.

Figure 4:
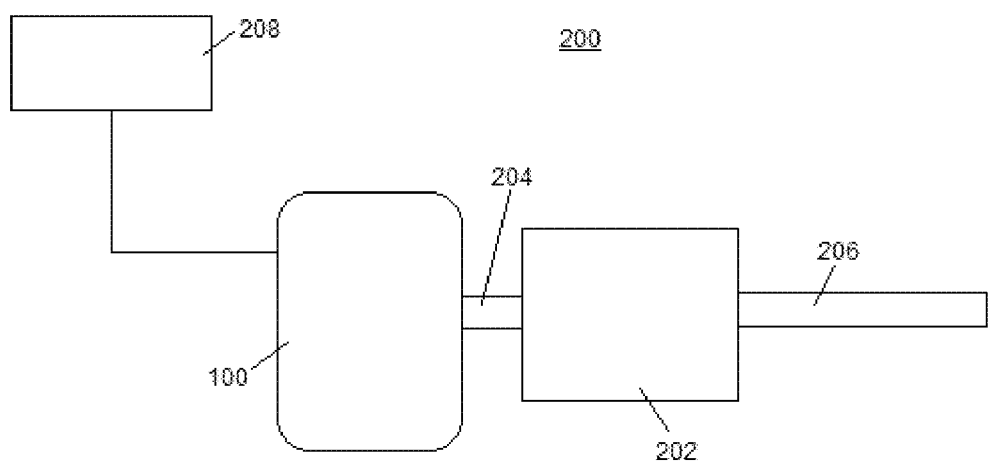
FIG. 4 depicts an embodiment of an actuator assembly including a linear motor.

FIG. 4 shows an embodiment of an actuator assembly 200 incorporating a linear motor as described herein. The actuator assembly 200 includes the linear motor 100, which is connected to a gear assembly 202 via an input shaft 204. The linear motor 100 and the gear assembly 202 may be separate components as shown, or may be incorporated into a single housing or device. The gear assembly 202 is in turn connected to an aircraft component (not shown), such as a wing flap or aileron, by a drive shaft or coupler 206. A processor or controller 208 (e.g., part of an aircraft control system) is electrically connected to the linear motor 100 to control movement of the aircraft component. Although the actuator assembly 200 is described in conjunction with an aircraft component, it is not so limited and can be applied to any device or system that utilizes rotary motors.

Figure 5:
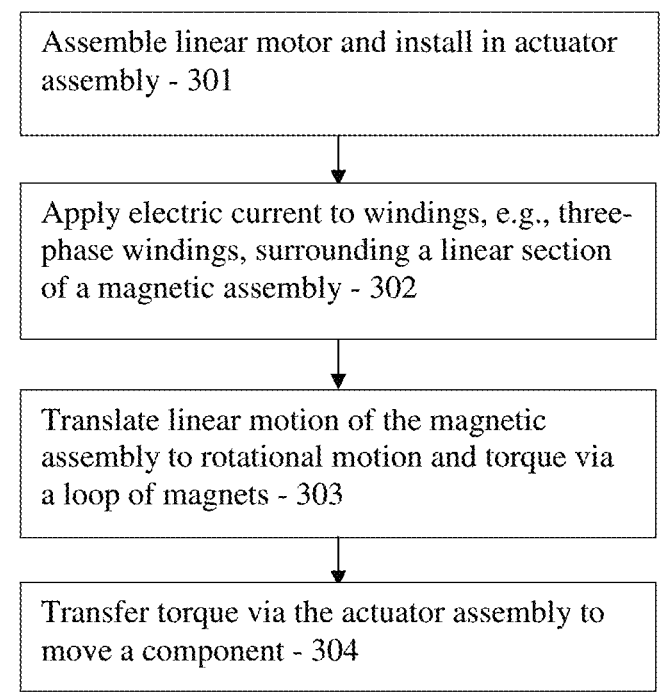
FIG. 5 is a flow chart illustrating an embodiment of a method of operating a linear motor.

FIG. 5 illustrates a method 300 of operating a linear motor and/or actuating a moveable component. The method 300 is discussed in conjunction with the linear motor 100 and the actuator assembly 200, although the method 300 may be utilized in conjunction with any suitable device or system that can utilize a linear motor as described herein. The method 300 includes one or more stages 301-304. In one embodiment, the method 300 includes the execution of all of stages 301-304 in the order described. However, certain stages may be omitted, stages may be added, or the order of the stages changed.

In the first stage 301, the linear motor 100 or other electric motor having a linear extending magnetic assembly as described herein is assembled and installed as part of an actuator device, e.g., the actuator assembly 200. For example, the actuator assembly is installed as part of an aircraft control system and is controlled by a pilot, operator and/or processing device (e.g., aircraft computer).

In the second stage 302, electric current is applied to the windings 108, e.g., three-phase windings. The electric current flows circumferentially through the windings 108 around a linear section of the magnetic assembly 104, causing movement of magnets 110 in a direction of the x-axis. In the third stage 303, linear motion and linear force generated by the interaction between the windings 108 and the magnets 110 is translated to rotational motion and torque via the loop configuration of the magnets 110. In the fourth stage 304, the torque is transferred to a component, e.g., an aileron or other moveable component of an aircraft. Other examples of the component include any moveable component or load (e.g., a pump).

Embodiments described herein provide a number of advantages and technical effects. For example, the linear motor configuration provides a compact design that can fit into thin or small enclosures, and thus allows the motor to be used in circumstances where space is limited. In addition, the linear motor configuration is advantageous for applications where rotary actuation is desired. For example, although conventional linear motor topographies can be used in limited space applications, the stroke of such a motor is limited by the length of the magnet track or forcer rod, and thus may be unsuitable for applications where force amplification is needed through mechanical advantage (i.e., gearing). Embodiments described herein provide an effective and compact mechanism for such applications.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft system, comprising: a movable aircraft component,
   a linear motor assembly that is controlled by a controller and operationally connected to the movable aircraft component, wherein the linear motor assembly comprises:
   an armature extending linearly along an axis, the armature having a plurality of windings; and
   a magnetic assembly including a plurality of magnets arrayed in a loop configuration,
   a linear section of the plurality of magnets extending linearly through the plurality of windings in a direction parallel to the axis,
   each magnet of the linear section being oriented in the direction and configured to move in the direction due to interaction between the plurality of windings and a magnetic field generated by the magnetic assembly,
   wherein the windings are wound circumferentially around the linear section of the plurality of magnets in a direction having a directional component that is in an angular direction around the linear section, and
   wherein the armature is an elongated rigid component, wherein the armature forms a tube through which the linear section of the plurality of magnets extends; and
   an additional armature configured the same as the armature and having a longitudinal axis that is at least substantially parallel to the axis and disposed at another location around the magnetic assembly.

2. The system of claim 1, wherein the plurality of magnets are configured as a chain of magnetic components, each of the magnetic components having a polarity in a direction of movement of the chain of magnetic components.

3. The system of claim 2, wherein the magnetic components are disposed on at least one of a belt or a chain.

4. The system of claim 1, further comprising a support structure configured to support the plurality of magnets, wherein movement of the plurality of magnets is configured to rotate at least one component of the support structure.

5. The system of claim 4, wherein
   the at least one component of the support structure is configured to transfer torque to a gear assembly via an input shaft connected between the linear motor assembly and the gear assembly; and
   the gear assembly is configured to move the moveable aircraft component via a drive shaft or coupler connected between the gear assembly and the moveable aircraft component.

6. A method of operating a movable aircraft component of an aircraft system, the method comprising:
   applying an electric current to a plurality of windings of a linear motor assembly that is controlled by a controller and operationally connected to the moveable aircraft component, the plurality of windings disposed on an armature of the linear motor assembly, wherein the armature extends linearly along an axis; and
   causing movement of a magnetic assembly of the linear motor assembly due to interaction between the plurality of windings and a magnetic field generated by a magnetic assembly,
   the magnetic assembly including a plurality of magnets arrayed in a loop configuration,
   a linear section of the plurality of magnets extending linearly through the plurality of windings in a direction parallel to the axis,
   each magnet of the linear section being oriented in the direction,
   wherein the movement of the magnetic assembly includes a movement of each magnet of the linear section in the direction and through the plurality of windings,
   wherein the windings are wound circumferentially around the linear section of the plurality of magnets in a direction having a directional component that is in an angular direction around the linear section, and
   wherein the armature is an elongated rigid component that is a linear stationary component, wherein the armature forms a tube through which the linear section of the plurality of magnets extends; and
   an additional armature configured the same as the armature and having a longitudinal axis that is at least substantially parallel to the axis and disposed at another location around the magnetic assembly.

7. The method of claim 6, wherein the plurality of magnets are configured as a chain of magnetic components, each of the magnetic components having a polarity in a direction of movement of the chain of magnetic components.

8. The method of claim 7, wherein the magnetic components are disposed on at least one of a belt or a chain.

9. The method of claim 6, further comprising a support structure configured to support the plurality of magnets, wherein movement of the magnetic assembly is configured to rotate at least one component of the support structure.

10. The method of claim 9, wherein the at least one component of the support structure is configured to transfer torque to a gear assembly via an input shaft connected between the linear motor assembly and the gear assembly; and
   the gear assembly is configured to move the movable aircraft component via a drive shaft or coupler connected between the gear assembly and the moveable aircraft component.

* * * * *